United States Patent [19]

Dwyer et al.

[11] 4,013,607

[45] Mar. 22, 1977

[54] SELF-STRIPPING COATING COMPOSITION

[75] Inventors: Sean G. Dwyer, Racine; Daryl J. Hackbarth, Kenosha, both of Wis.

[73] Assignee: S. C. Johnson & Son, Inc., Racine, Wis.

[22] Filed: June 19, 1974

[21] Appl. No.: 480,981

[52] U.S. Cl. ............... 260/29.6 H; 260/28.5 R; 260/29.6 TA; 260/29.6 WB

[51] Int. Cl.² ..................................... C08L 33/02

[58] Field of Search ............... 260/28.5 R, 29.6 H, 260/29.6 WB

[56] References Cited

UNITED STATES PATENTS

| | | | |
|---|---|---|---|
| 3,313,755 | 4/1967 | O'Rourke | 260/28.5 R |
| 3,320,196 | 5/1967 | Rogers | 260/901 |
| 3,380,944 | 4/1968 | Kay | 260/28.5 R |
| 3,598,778 | 8/1971 | Burdick | 260/29.6 H |
| 3,711,436 | 1/1973 | Oliver | 260/28.5 R |
| 3,793,275 | 2/1974 | Corey | 260/28.5 R |

FOREIGN PATENTS OR APPLICATIONS 868,423  4/1971  Canada

*Primary Examiner*—Paul R. Michl

[57] ABSTRACT

An improved stable self-stripping aqueous coating composition, adapted to simultaneously disperse a previously deposited dried coating composition and replace the dried composition with a fresh coat, includes a solution of an alkali soluble resin of low molecular weight and high acid number and aqueous ammonia in sufficient concentration to provide a pH no less than about 9.0. Surfactants and waxes may also be employed in the coating composition as well as conventional additives, however, metal-fugitive ligand complexes are not needed for the self-stripping properties.

20 Claims, No Drawings

SELF-STRIPPING COATING COMPOSITION

BACKGROUND OF THE INVENTION

The present invention relates to stable, aqueous coating compositions. In particular the invention relates to an improved stable aqueous coating composition containing as the primary coating agent an alkali soluble resin of low molecular weight and high acid number and aqueous ammonia sufficient to provide a pH no less than about 9.0.

In the protective coating field, such as temporary organic coatings, including certain floor coatings, it is desirable to have minimum carboxyl functionality present in order to avoid the solubilizing and spotting effects normally obtained when water is brought into contact with such coating. However, the hardness, durability, gloss, and removability properties of these films are effected by the degree of carboxyl functionality present. Therefore, most coating compositions developed heretofore, represent a compromise with respect to properties such as hardness, durability, gloss, removability, and resistance.

It has been found that various organic films containing carboxyl functionality sufficient to obtain easy removal, tend, upon aging, to undergo a degrading effect; that is a loss of functionality which renders the carboxyl groups substantially unavailable. This degrading effect produces films which are difficult to remove by means of conventional film remover substances, such as detergents, and results in film buildup. Film buildup is usually accompanied by degradation in color, for example, yellowing, and eventually necessitates complete film removal with high caustic solutions or solutions containing organic solvents or by various abrasive methods, all of which have been found to effect the substrate adversely.

The problem of removability, degradation and film buildup was alleviated greatly by the use of the metal cross-linked polymers disclosed in U.S. Pat. Nos. 3,308,078 and 3,320,196. The metal complex salts disclosed in the above patents form temporary bonds or cross-links between adjacent polymer carboxyl functional groups so as to retard their exposure and subsequent degradation. These floor coating compositions provided films with good gloss and strength which could be easily removed by cleaning with detergent and ammonia but are water insensitive and detergent resistant under normal conditions.

For many applications, among them the home, it has been deemed desirable to maintain highly polished floor surfaces for aesthetic appeal as well as for other reasons. In lieu of detergent-cleaning a yellowed or dirty floor film, it is considered highly desirable to merely recoat and thereby simultaneously clean and remove the old polish layer and form a new film. Accordingly, the need has arisen for a self-stripping floor polish adapted to be frequently reapplied to maintain a highly polished substrate which is not to be washed with detergent between applications. The polish must have non-yellowing characteristics and be shelf-stable.

Recently, various innovations have been introduced permitting a dried floor coating to be simultaneously cleaned and polished without the need for conventional washing and repolishing, and without film buildup. As illustrated in U.S. Pat. No. 3,308,078 modifications in the above type of formulation can produce a stable, aqueous coating composition which provide metal-containing organic films having unique structural integrity; captive functional groups which are not easily degraded; controlled removability and high gloss, hardness and durability. These coatings are designated as self-sensitive coatings and after application are resistant to detergent washing and can be removed by recoating. Upon recoating, a portion of the dried film is dispersed in the fresh coating and a new coating is provided which is substantially free from the heel marks, scuffs, and other dirt contained in the old dried coating.

The stable self-stripping aqueous floor coating composition of the present invention comprises as the primary coating agent a solution of an alkali soluble resin having a weight average molecular weight of from about 500 to about 40,000 and an acid number within the range of from 120 to 550. This alkali soluble resin is an addition resin containing at least two ethylenically unsaturated monomers, one of these monomers being a ligand-free monomer while the other monomer contains carboxyl functional groups. The coating composition of the present invention also includes aqueous ammonia in a concentration sufficient to provide a pH of no less than about 9.0 and a combined amount of wax, solvent, leveling agent, surfactant and high molecular weight polymer equal to or greater than 9% by weight of the resin. This composition is readily adapted to disperse a previously deposited dried coating composition of itself and replace the dried coating with a fresh coating having even gloss and durability.

SUMMARY OF THE INVENTION

It is, therefore, a primary object of the present invention to provide an improved self-stripping coating composition.

It is a further object of the invention to provide a self-stripping coating composition free from the tendency to gel and change viscosity upon storage.

It is a further object of the present invention to provide a simple efficient self-stripping composition which does not contain any metal complexing agent.

It is another object of the invention to provide a coating composition adapted to remove deep scuffs and scratches from previously polished floors upon recoating.

It is an additional object to provide a self-stripping coating composition adapted to disperse a previously applied coating and to recoat a substrate with substantially a single layer of new coating film, thereby reducing or eliminating the buildup in film thickness that characterizes conventional floor polishes.

Still further objects and advantages of the floor polish composition of the present invention will become more apparent from the following more detailed description thereof.

DEFINITIONS

For the purposes of the present invention a "stable" composition is defined as a fluid substance which can be stored for prolonged periods and is substantially free from gelling and substantially free from changes in viscosity. It is essential that the self-stripping coating compositions of the invention be stable. In order to obtain the self-stripping films of the invention and in order to disperse a substantial amount of the film, the self-stripping coating composition must be substantially free from gellation and/or precipitation and have substantially the same composition throughout.

The stability of the presently claimed self-stripping coating compositions can be monitored by periodic optical density measurements can be verified by monitoring physical changes in the compositions during prolonged continuous exposure at high temperature conditions. Procedures for monitoring optical density and physical changes are illustrated in U.S. Pat. No. 3,308,078.

As employed herein, the term "self-stripping" refers to the ability of the instant coating compositions to react with a film obtained from the composition and to disperse a substantial quantity of the film in the liquid coating composition in less than half a minute. Also, the term "simultaneously", when used to describe a "self-stripping" composition, means the composition disperses in less than half a minute.

As employed herein, the "acid number" of the resins used in the present invention is the actual or observed value as distinguished from the theoretical value and can be observed by dissolving the resin in a solution containing 66% by weight ethanol and 34% by weight benzene and titrating the resin/solvent mixture to the phenophthalein end point with a 0.1 N aqueous NaOH solution. This general procedure is described by Pinner in "Practical Course in Polymer Chemistry" (1961), Pergamon Press, New York, N.Y., at page 113. It is understood for the purposes of the present invention that the term "acid value" can be used interchangeably with the term "acid number".

DETAILED DESCRIPTION OF THE INVENTION

The present invention is directed to a stable coating composition adapted to simultaneously disperse a previously deposited dried coating composition and replace the dried composition with a fresh coating comprising 50–96% by weight water, 0–10% by weight plasticizer, 0–5% by weight leveling agent, 0–10% by weight organic solvent, 0–5% by weight surfactant, 0–15% by weight wax, 0–10% by weight film-modifying polymer and 3–18% by weight polymeric coating agent, with the proviso that the total non-volatiles of the composition is in the range of from 4–20% by weight, and the combined non-volatiles of the leveling agent, solvent, plasticizer, surfactant, wax and film-modifying polymer are equal to or greater than 9% of the non-volatiles of the polymeric coating agent wherein the improvement comprises using as the polymeric coating agent a solution of an alkali soluble resin having a weight average molecular weight from about 500 to 40,000 and an acid number from about 120 to 550, said resin being an addition resin formed from (a) at least 1 ethylenically unsaturated ligand-free monomer and (b) at least 1 ethylenically unsaturated monomer having at least 1 carboxyl group, wherein said resins contain from about 40–85% by weight of monomer (a) and from 60–15% by weight monomer (b), adding aqueous ammonia to said composition in an amount sufficient to provide a pH of no less than 9.0, and said composition being substantially free of complex salts of cross-linking metals such as zinc, cadimum, copper, etc.

The preferred self-stripping stable coating compositions of the present invention are aqueous compositions containing preferably from about 4% to about 18% non-volatiles. Particularly enhanced gloss and self-stripping characteristics are obtained when the aqueous composition contains from about 10 to 14% non-volatiles by weight.

In addition to the above self-stripping stable coating compositions containing from about 4 to 20% non-volatiles, the composition of the present invention may also be prepared in a concentrated or bucket-dilutable form containing up to about 55% solids. Of course, these concentrated compositions are designed to be diluted during use to a composition having a solids content between 4 and 20%. Alternatively, the concentrated product may be directly applied to the floor and subsequently mopped or diluted with a wet mop.

The bucket-dilutable compositions of the present invention utilize the same materials in the same relative ratios. The only difference is that the solids level is greatly increased while the water level is reduced. These compositions comprise 20–50% by weight water, 0–20% by weight plasticizer, 0–10% by weight leveling agent, 0–25% by weight organic solvent, 0–20% by weight surfactant, 0–20% by weight wax, 0–20% by weight film-modifying polymer and 18–45% by weight polymeric coating agent at a solids level of from 20–55%.

The resins for use as the polymeric coating agent should be alkali soluble and contain at least about 0.0021 equivalent of carboxyl group per gram of resin and be capable of being substantially completely solubilized when a minimum of from about 80 to 90% of these carboxyl groups are neutralized with an aqueous solution of basic substances such as borax, amines, ammonium hydroxide, sodium hydroxide and/or potassium hydroxide. For example, a suitable styrene-acrylic acid resin having an acid number of about 190 would contain no less than about 0.0034 equivalent of carboxyl groups per gram of resin and would be substantially completely solubilized when a minimum of from about 80 to 90% of the carboxyl groups are neutralized by an aqueous base solution.

The alkali soluble resins useful in the composition of the present invention are addition resins containing at least two ethylenically unsaturated monomers. One of these said monomers should be a hard monomer, sometimes referred to as the ligand-free monomer. The other monomer should be a ligand-containing polymerizable monomer providing the necessary acid functionality which contributes substantially to film performance and assists in maintaining such desirable properties as film hardness, gloss, durability and controlled removability.

The acid number of the lower molecular weight alkali soluble resins is critical and influences both the solubility of the resins in the aqueous alkaline coating compositions and also the self-stripping properties of the films produced from these compositions. For example, at an acid number substantially below about 120, certain of the addition resins are relatively insoluble in the aqueous coating compositions of the invention. Also, at these low acid numbers, the films formed from such resins are not readily self-strippable and detergents and the like must be employed with high alkali content to remove films formed from such resins. When the acid number of the addition resin is substantially above about 550, the films formed from such coating compositions tend to be highly subject to water spotting. Accordingly, for the self-stripping coating compositions the acid value of the addition resin ranges between 120 and 550, between about 150 and 300, and most preferably will range from about 150 to about 250.

The molecular weight of the alkali soluble resins of the invention is also critical. The generally low molecular weight of the preferred polymers keeps the viscosity of the coating composition within acceptable limits. The viscosity of a solution of the alkali soluble polymers is strongly dependent on the pH, on the acid number, and on the molecular weight of the resins. As stated hereinabove, it is necessary to keep the pH of the coating composition at a relatively high level. Therefore, to control viscosity and to increase the resin self-stripping, it has been found that low molecular weight polymers are necessary.

The preferred molecular weight for a specific alkali soluble resin is, in part, dictated by its acid number, the pH of the coating composition employing the resin and the percentage of solids in the coating composition. To assist in the dispersion of the dried film upon recoating, to control viscosity at a low level and to enhance the gloss of the preferred coating compositions, resins having a weight average molecular weight from about 500 to 40,000 should be used, with polymers having a molecular weight of 500 to 30,000 being preferred and those with a molecular weight of 500 to 10,000 being most preferred since enhanced results are obtained.

For the purposes of the present invention, the ligand-free monomer should be free from any atom, molecule, or ion capable of forming a coordinate bond, such as a carboxyl ion. Suitable ligand-free monomers must also be capable of undergoing addition polymerization. The resins should contain from 40 to 85% ligand-free monomer and preferably 40 to 75%.

If desired, the ligand-free monomer can be a mixture of monomers. Exemplary of such ligand-free monomers are vinyl toluene, methyl methacrylate, butyl methacrylate, acrylonitrile, vinyl acetate, styrene, α-methyl styrene, butyl acrylate, ethacrylate, 2-ethylhexyl acrylate and mixtures. Other suitable monomers and comonomers are disclosed in U.S. Pat. No. 3,308,078, columns 9 and 10; this patent being expressly incorporated herein by reference.

The ligand-containing polymerizable, ethylenically unsaturated monomer utilizes carboxyl groups as the preferred polymer ligand. Preferred ligands are ethylenically unsaturated alkanoic and alkandioic acids, particularly those having 3 to 8 carbon atoms. Examples of preferred acids include acrylic, methacrylic, crotonic, isocrotonic, maleic, fumaric, itaconic acids and anhydrides of these acids, as well as mixtures thereof.

Stability and self-stripping of the coating compositions are enhanced; and accordingly, it is preferred to employ an alkali soluble resin containing acrylic acid, methacrylic acid, or mixtures as the ligand-containing monomer.

In general, the minimum weight percentage of ligand-containing monomer in the alkali soluble resin will be determined by the amount of acid functionally necessary to give the resin required alkali solubility in aqueous media. For most purposes at least about 15% and preferably 25% by weight of resin of ligand-containing monomer is employed. The maximum weight percentage of ligand-containing monomer is determined by a combination of various factors; among them viscosity of the resulting composition, water spotting sensitivity of the dried coat resulting from the coating composition and tackiness of the resulting film when the coating composition is applied to a substrate.

In general up to about 60% by weight ligand-containing monomer may be employed in the resin. Above about 60% monomer the resulting coating composition tends to become excessively viscous during storage and during use. Further, the dried film resulting when the coated composition containing the monomer is applied is excessively water sensitive and will have a tendency to spot unduly.

Although any combination of the above monomers in the ranges set forth above which forms a continuous film will be suitable for use in the self-stripping finish of the present invention, resins made from the following combinations of monomers are preferred: styrene/acrylic acid; styrene/maleic anhydride; methylmethacrylate/butyl acrylate/methacrylic acid; α-methylstyrene/ethyl acrylate/acrylic acid; styrene/butyl acrylate/acrylic acid; and styrene/methyl methacrylate/butyl acrylate/methacrylic acid.

A preferred alkali soluble resin is a 68% styrene/32% acrylic acid resin having a weight average molecular weight of about 500 to 10,000. Other preferred addition resins include a partially esterified styrene-maleic anhydride resin having an acid number of about 200 and a molecular weight of about 1400 and a 45% α-methylstyrene/30% ethyl acrylate/25% acrylic acid having an acid number of 155 and a weight average molecular weight of 5,000. In general, styrene-acrylic acid resins having number average molecular weights from about 2,500 to 4,500 and weight average molecular weights of 6,500 to 9,500, as well as an acid number of 170 to 200, are particular preferred.

Aqueous ammonia is present in the coating compositions of the invention in a concentration sufficient to provide a pH of at least about 9.0 and preferably above 9.5. It has been found that the high pH level substantially enhances the self-stripping character of the composition. Ammonia may be provided in the coating composition in the form of concentrated ammonium hydroxide. A portion or all of the ammonium hydroxide may be replaced with sodium or potassium hydroxide or organic amine. However, such replacement is usually accompanied by a decrease in the water resistance (spotting resistance) of the product.

In order to enhance the characteristics of a film formed from the instant coating composition from 0–10% by weight of a polyhydroxy polyether, a lower alkanol or high-boiling glycol is present in the present composition. These organic solvents aid in extending the drying time of the coating composition and imparts increased gloss and leveling characteristics to the composition. Typical polyethers include mono- di-alkyl ethers of diethylene glycol and their derivatives, also known as carbitols. Typical glycols are ethylene glycol, polyethylene glycol, propylene glycol, polypropylene glycol, etc., while the alkanols include isopropanol, butanol, etc. A particularly preferred polyether is diethylene glycol monoethyl ether. The polyethers can be used alone or combined with the alkanols or polyhydric alcohols, such as ethylene glycol.

The film forming compositions may contain from about 0 to about 10% by weight plasticizers wherever necessary, to provide a film of suitable hardness and appearance. It has been found that most hard resins can be plasticized to improve their film forming properties. Since the purpose of the plasticizer is to impart film forming properties to the coating composition and since it is not always necessary to impart flexibility to the resin composition when it is inherently tough and flexible, a fugitive or semi-fugitive plasticizer may sometimes be employed rather than a permanent plasticizer. Mixtures of fugitive and permanent plasticizers may also be employed.

Examples of essentially permanent plasticizers that are suitable include benzyl butyl phthalate, dibutyl phthalate, dimethyl phthalate, triphenyl phosphate, 2-ethyl hexyl benzyl phthalate, butyl cyclohexyl phthalate, mixed benzoic acid and fatty oil acid esters of pentaerythritol, poly (propylene adipate) dibenzoate diethylene glycol dibenzoate, tetrabutylthiodi-succinate, butyl phthaly butyl glycolate, triethyl citrate, acetyl triethyl citrate, tributyl citrate, acetyl tributyl citrate, dibenzyl sebacate, tricresyl phosphate, toluene ethyl sulfonamide, the di-2-ethylhexyl ester of hexamethylene glycol diphthalate, di-(methylcyclohexyl)-phthalate and tributyl phosphate.

Examples of fugitive plasticizers include the monethyl or monomethyl ether of diethylene glycol, isophorone, benzyl alcohol, and 3-methoxybutanol-1. The particular plasticizer amount thereof employed are chosen in accordance with the demand for compatibility and efficiency by making the film more flexible.

A particularly preferred plasticizer which also serves as a leveling agent is tributoxyethyl phosphate.

An extremely desirable ingredient in the present coating compositions which serves as a leveling agent and a self-sensitizer of the composition is a surfactant. It is preferred to employ anionic or nonionic surfactants and particularly non-foaming surfactants to reduce the tendency of the coating composition to form bubbles upon application. The surfactants increase the storage stability of the composition and permit even film formation of the coating composition upon application (leveling).

Usable water soluble, low foaming nonionic surfactants include organo-ethylene oxide condensates as described in U.S. Pat. No. 3,308,078, in columns 21 and 22.

Examples of suitable low foaming anionic surfactants include alkali metal and ammonium salts of higher fatty acids having 12 to 22 carbon atoms. Typical anionic surfactants include the sodium, potassium, ammonium and morpholine oleates, ricinoleates, stearates or isostearates.

Mixtures of anionic and nonionic surfactants may be employed. Enhanced results are obtained; and, accordingly, it is preferred to employ a mixture of oleic acid and octylphenoxy polyethoxy ethanol as surfactants.

The quantity of surfactants employed will depend in part upon the characteristic of the alkali soluble resin. In general from about 0 to 5% by weight surfactants are employed based on the weight of the total composition.

If desired, the preferred plasticizer and surfactants can be replaced in part with dibutylphthalate; however, the gloss and leveling characteristics of the resulting films are impaired somewhat.

In addition to the surfactants and plasticizers, alkaline builders such as the ammonium and alkali metal salts of ethylenediamine tetraacetic acid, nitrilotriacetic acid, diethylenetriaminepentaacetic acid, citric acid, and the phosphonates can be optionally included to provide stability and improved cleaning characteristics in an amount of from 0 to 5% and preferably 0 to 2%.

In addition to the leveling function of some plasticizers and surfactants, the composition of the present invention also may include from 0 to 5% of a leveling agent to assist the composition in leveling over other finishes such as the fluorochemical leveling agents disclosed in U.S. Pat. No. 2,937,098 herein incorporated by reference, gelatine, perfluorinated cyclo-compounds disclosed in U.S. Pat. No. 3,163,547, herein incorporated by reference, and other known leveling agents.

It has been observed that when the self-stripping coating compositions of the invention are to be employed as polishes and/or in other high gloss formulations which are exposed to foot traffic, for example, floor coatings, it is preferable that the compositions contain a wax. Various waxes or mixtures of waxes can be employed which would be stable in the overall system. Such waxes include those waxes derived from a vegetable, animal, synthetic and/or mineral source or mixtures thereof. Examples of such waxes include carnauba, candelilla, montan, lanolin, cocoa butter, cottonseed, stearin, Japan wax, bayberry, myrtle, mace, palm kernel, beeswax, spermacetic, Chinese insect, mutton tallow, polyethylene, polypropylene, waxes obtained by the hydrogenation of cocoanut oil or soybean oils, and the mineral waxes such as paraffin, ceresin, ozokerite, etc.

Particularly preferred waxes include mixtures of a polyethylene wax emulsion and a polypropylene wax emulsion, each emulsion containing about 25% waxy solids. In general from about 0 to 15% by weight waxes are employed based on the weight of alkali soluble resin solids.

The compositions of the present invention may also include a small percentage, i.e., from 0 to 10% of a film-modifying polymer. These film-modifying polymers are higher molecular weight materials with weight average molecular weights above 40,000 and often in excess of 200,000. These materials can be included to modify the performance characteristics of the resultant films and provide the films with additional wear resistance, toughness, etc. High levels of these materials must be avoided since the high pH of the product causes these high molecular weight polymers to become quite viscous which inhibits the ability of compositions containing these materials to be truely self-stripping.

Although the solvent, plasticizer, surfactant, leveling agent, wax, film-modifying polymer or any combination of these may be omitted from the composition, the combined non-volatiles of these non-resin materials must be present in an amount at least equal to or greater than 9% of the non-volatiles of the polymeric coating agent or resin for adequate performance and film properties. Although there is no real upper limit at percentages over 200%, the self-stripping properties are reduced. Preferably, this percentage is less than 100%.

The compositions of the present invention are further characterized by the absence of complex salts of metals which temporarily crosslink the resins. These salts as disclosed in U.S. Pat. No. 3,308,087 and 3,320,196, incorporated by reference, are not required to impart self-stripping properties to the compositions of the present invention.

The compositions are generally adapted to form clear, glossy coatings. However, if desired, a translucent appearance or an opaque or colored appearance may be obtained by the introduction of dulling agents, water-soluble or oil-soluble dyes in suitable proportions. Also, other non-essential components such as perfumes may be included in small amounts.

The compositions of the invention may be used for impregnating textiles, leather, paper or other porous or fibrous materials. They may also be applied to plastic sheets such as cellophane, polyethylene, polyethylene glycol terephthalate, saran and the like. They may also be applied to rigid surfaces, including metals, such as steel, aluminum, copper, tin, wrought iron and painted surfaces such as auto bodies. The compositions can also be applied to wood, stone, brick, glass, cement, asbestos shingles or siding, terrazzo, and concrete surfaces, such as floors and the like. The compositions are particularly preferred for polishing floors and plastic tiles, such as linoleum, asphalt vinyl and vinyl-asbestos.

In general, the ingredients may be admixed in the order desired. Where a wax is employed in the coating compositions, it is usually added to the composition in the form of an emulsion. Typical wax emulsions contain approximately 20 to 40% by weight solids and are formed by dispersing the wax in water by means of a suitable anionic or dispersing agent. Suitable agents include sodium salts of higher fatty acid sulfates, the higher fatty acid salts, ethylene oxide modified alkyl phenols and other conventional dispersing agents. Particularly useful dispersing agents include amine salts of soap, such as ethanolamine or morpholine oleate or stearate.

The coating compositions can be applied to numerous substrates as set forth hereinbefore by various methods including application with a rag, mop, brush, non-woven cloth and by spraying and/or dipping.

The following examples are provided to further illustrate the present invention and are not limitive of scope.

EXAMPLE I

To demonstrate the effectiveness of the present invention, several self-stripping coating compositions were prepared. Unless otherwise stated, the weights of the ingredients are in parts by weight.

| COMPONENT | PARTS | PARTS/ NON-VOLATILE |
|---|---|---|
| Styrene Acrylic Acid Resin Solution (20%) | 58.800 | 11.760 |
| Tributoxyethyl Phosphate | 0.600 | 0.600 |
| Oleic Acid | 0.600 | 0.600 |
| Octylphenoxy Polyethoxy Ethanol (70%) | 0.686 | 0.480 |
| Polyethylene Wax Emulsion (25%) | 1.680 | 0.420 |
| Polypropylene Wax Emulsion (25%) | 0.560 | 0.140 |
| Pentel 3611 Fluorochemical | 0.020 | — |
| Concentrated Ammonium Hydroxide | 1.400 | — |
| Water | 35.454 | — |
| Perfume | 0.100 | — |
| Dye at 1% | 0.100 | — |
| | 100.000 | 14.000 |

The pH of the composition was 9.6. The bulk of the non-volatiles were derived from the styrene-acrylic acid resin solution with the other percentage of non-volatiles being 19.05% of the resin non-volatiles (non-resin non-volatiles). The resin was a low molecular weight acidic copolymer with a monomer distribution of 68% styrene and 32% acrylic acid, based on the weight of copolymer. The resin solids have an acid number of 180 to 190. The resin solution also contained minor quantities of a sequestering agent and hydrogen peroxide for cosmetic purposes. The resin solution additionally contained 5% of diethylene glycol monoethyl ether.

The composition had excellent storage stability. The composition was applied to a vinyl floor by conventional means and allowed to dry. The dried polish was scuffed and scratched. A second coat of polish was applied to the dried coat and the scuffs and scratches were readily removed. The above composition provided a non-yellowing floor polish with excellent water spotting resistance.

EXAMPLE II

A floor coating composition having the following formulation was prepared:

| COMPONENT | PARTS BY WEIGHT |
|---|---|
| Polymer at 34.7% solids* | 29.865 |
| Water | 57.816 |
| Ammonium Hydroxide | 3.500 |
| Carbitol | 5.000 |
| 1% solution of Pentel 3611 Fluorochemical | 0.500 |
| Triton X-405 (70% solids) | 0.823 |
| Tributoxyethyl Phosphate | 0.576 |
| 25% solids emulsion of AC-392 Polyethylene Wax | 1.920 |
| | 100.000 | pH = 9.70
Non-volatiles = 12.0%
Non-resin non-volatiles = 15.8%
*The monomer composition of the polymer was as follows:
    Methylmethacrylate   46.2%
    Butyl Acrylate   30.0%
    Methacrylic Acid   23.8%
Acid number = 155 and the molecular weights as determined by G.P. C. were
    $M_n$ = 12,100

Mw = 32,100

When this formulation was utilized to coat a floor, the same was completely self-stripping and had good gloss and leveling characteristics.

EXAMPLE III

A strippable floor coating composition having the following formulation was prepared:

| COMPONENT | PARTS BY WEIGHT |
|---|---|
| Water | 51.666 |
| Concentrated Ammonium Hydroxide | 1.221 |
| Carbitol | 4.568 |
| Pentel 3611 Fluorochemical (25%) | 0.020 |
| Triton X-405 (70%) | 0.698 |
| Oleic Acid | 0.610 |
| Styrene Acrylic Acid Solution (25.3%)* | 36.623 |
| Tributoxyethyl Phosphate | 0.610 |
| AC-392 Wax Emulsion (25%) | 1.953 |
| Poly Em-20 Wax Emulsion (40%) | 1.831 |
| Perfume | 0.100 |
| Dye (1%) | 0.100 |
| | 100.000 |

Non-volatile = 12%
Non-resin non-volatile = 28.3%
pH = 9.6
*The resin is 67.5% S and 32.5% AA and has an acid number of 180 to 190. The Mn is 3,600 to 4,000 and Mw is 7,000 to 8,000.

When utilized as a floor coating composition, this formulation had excellent gloss and leveling characteristics and was self-stripping, relatively water-insensitive, and was reasonably durable in use.

EXAMPLE IV

A floor coating composition having the following formulation was prepared:

| COMPONENT | PARTS BY WEIGHT |
|---|---|
| Water | 33.356 |
| Ethylene Glycol | 5.000 |
| Triton X-405 (70%) | 0.800 |
| SMA Resin Solution* (20%) | 51.450 |
| Polymer Emulsion (35%)** | 5.000 |
| Tributoxyethyl Phosphate | 0.840 |
| AC392 Polyethylene Wax Emulsion (25%) | 2.154 |
| Concentrated Amonium Hydroxide | 1.200 |
| Dye (1%) | 0.100 |
| Perfume | 0.100 |
| | 100.000 | pH = 9.75
Non-volatile = 14.0%
Non-resin non-volatile = 36.05%
*Resin solution is 20% solution of SMA 17352 from ARCO. Resin has acid number of 260 to 280. The solution contains fatty acid and fluorochemical.
**The polymer is a 35% solids emulsion of a polymer with the following monomer distribution:
    38% methyl methacrylate
    52% 2-ethylhexylacrylate
    9% methacrylic acid
The molecular weight of the polymer is in excess of 200,000.

This formulation, when applied to the floor as a floor wax or coating composition, had excellent initial leveling and gloss as well as good gloss and leveling characteristics subsequent to the utilization of the same as a self-stripping cleaner. Furthermore, the sensitivity to water and the durability to traffic were judged as good.

EXAMPLE V

A still further floor coating composition was prepared having the formulation as follows:

| COMPONENT | PARTS BY WEIGHT |
|---|---|
| Water | 33.488 |
| Ethylene Glycol | 3.870 |
| Triton X-405 (70%) | 0.800 |
| Fluorochemical FC-420 (1%) | 0.500 |
| SMA Resin Solution (20%)* | 46.200 |
| Polymer Solution** | 10.048 |
| Tributoxyethyl Phosphate | 0.840 |
| Tall Oil Fatty Acid | 0.700 |
| Anionic AC392 Polyethylene Wax Emulsion (25%) | 2.154 |
| Concentrated Ammonium Hydroxide | 1.200 |
| Dye (1%) | 0.100 |
| Perfume | 0.100 |
| | 100.000 | pH = 9.75
Non-volatile = 14%
Non-resin non-volatile = 51.52%
*A 20% solids solution of SMA 17352 (supplied by ARCO) in H$_2$O and NH$_4$OH. Resin has acid number of 260 to 280.
**A 20.9% solids solution of polymer in solvent, NH$_4$OH and H$_2$O. The polymer has a molecular weight of greater than 200,000 and the following monomer distribution:
    42% methyl methacrylate
    50% 2-ethylhexylacrylate
    8% methacrylic acid This formulation, like the formulation from Example IV, utilized ethylene glycol in place of the polyether utilized heretofore. The floor coating composition was quite satisfactory as regards self-stripping properties and had good gloss and leveling characteristics as well as good durability to traffic and moderate water resistance.

EXAMPLE VI

A still further floor coating composition in accordance with the present invention was prepared having the formulation as follows:

| COMPONENT | PARTS BY WEIGHT |
|---|---|
| Water | 52.272 |
| Ammonium Hydroxide | 1.200 |
| Carbitol | 3.783 |
| Pentel 3611 Fluorochemical (25%) | 0.020 |
| Triton X-405 (70%) | 0.686 |
| Oleic Acid | 0.600 |
| Resin Solution* | 36.919 |
| Tributoxyethyl Phosphate | 0.600 |
| AC-392 Wax Emulsion (25%) | 1.920 |
| Poly EM 20 Wax Emulsion (40%) | 1.800 |
| Perfume | 0.100 |
| Dye (1%) | 0.100 |
| | 100.000 | pH = 9.6
Non-volatile = 12.0%
Non-resin non-volatile = 31.59%
*Resin solution is 24.7% non-volatile and contains a solution prepared copolymer with the following monomer composition: 59% S, 10% BuA, 31% AA. Mw < 10,000.

This formulation performed quite adequately as regard to coating characteristics and especially self-stripping capacity, high gloss and leveling characteristics. The durability and resistance to water spotting were good.

EXAMPLE VII

A still further composition in accordance with the present invention for use as a floor coating composition was prepared having the following formulation:

| COMPONENT | PARTS BY WEIGHT |
|---|---|
| Water | 39.060 |
| Ammonium Hydroxide | 1.396 |
| Carbitol | 4.985 |
| Pentel 3611 Fluorochemical (25%) | 0.020 |
| Triton X-405 (70%) | 0.800 |
| SMA Resin Solution* | 48.055 |
| Tributoxyethyl Phosphate | 0.598 |
| AC-392 Wax Emulsion (25%) | 4.786 |
| Dye (1%) | 0.200 |
| Perfume | 0.100 |
| | 100.000 | pH = 9.65
Non-volatile = 12%
Non-resin non-volatile = 24.85%
*SMA resin solution is 20% non-volatile and is made from SMA 17352A supplied by ARCO. It has an acid number of 260 to 280.

When coated on tile floors as a floor polish composition, the above composition excellent self-stripping capacity, good gloss and leveling characteristics, as well as reasonable resistance to water spotting and adequate durability to traffic.

EXAMPLE VIII

A formulation having the concentrate composition as follows was prepared:

| COMPONENT | PARTS BY WEIGHT |
|---|---|
| Water | 53.731 |
| Ammonium Hydroxide | 1.400 |
| Carbitol | 0.882 |
| Pentel 3611 Fluorochemical (25%) | 0.020 |
| Triton X-405 (70%) | 0.686 |
| Oleic Acid | 0.600 |
| Styrene Acrylic Acid Resin (20%)* | 28.800 |
| Polymer Emulsion** | 9.361 |
| Tributoxyethyl Phosphate | 0.600 |
| Poly Em 20 Wax Emulsion (40%) | 1.800 |
| AC-392 Polyethylene Wax Emulsion | 1.920 |
| Dye (1%) | 0.100 |
| Perfume | 0.100 |
| | 100.000 | pH = 9.6
Non-volatile = 12%
Non-resin non-volatile = 120.93%
*The resin has an acid number of 180 to 190 and is 67.5% S and 32.5% AA.
**The polymer emulsion is 35% non-volatile and has the following monomer distribution:
  10 parts styrene
  50 parts methylmethacrylate
  30 parts butyl acrylate
  10 parts methacrylic acid
The molecular weights of the polymer are as follows:
  Mn = 4,200
  Mw = 9,000

When the above formulation was utilized as a floor coating composition in accordance with the present invention, the same had excellent self-stripping capacity, as well as good gloss, durability, and leveling characteristics. Also, the resistance to water spotting was adequate.

EXAMPLE IX

A composition in accordance with the present invention which is designed to be diluted with water before use to approximately 2–20% solids was prepared having the following composition:

| COMPONENT | PARTS BY WEIGHT |
|---|---|
| Water | 32.03 |
| Trisodium NTA | 1.50 |
| Propylene Glycol | 17.00 |
| Pentel 3611 Fluorochemical (1%) | 0.50 |
| Concentrated Ammonium Hydroxide | 15.00 |
| Water Soluble Blue Dye at 1% | 0.10 |
| Tributoxyethyl Phosphate | 1.59 |
| Styrene/Acrylic Acid Resin Flakes* | 33.98 |
| Triton X-405 | 1.90 |
| Tall Oil Fatty Acid | 1.59 |
| | 105.19 | pH = 9.6
Non-volatile = 40%
Non-resin non-volatile = 17.71%
*The resin is 67.5% styrene and 32.5% acrylic acid. It has an acid number of 180 to 190. Mn = 3,600 to 4,000 and Mw = 7,000 to 8,000.

When the above formulation was diluted with water to 4% solids, the diluted composition had excellent self-stripping properties, excellent durability, excellent gloss and leveling characteristics. Also, the resistance to water spotting was good.

When the above composition was diluted to 20% solids, the results upon coating were also quite good with the 20% solids composition having good self-stripping action, high gloss and durability, as well as leveling characteristics.

Also, when the above formulation was prepared as a 2% solids dilution, the composition performed adequately. Although the gloss was somewhat reduced, the composition was self-stripping and was reasonably level.

EXAMPLE X

A still further bucket-dilutable formulation having the composition as follows was prepared:

| COMPONENT | PARTS BY WEIGHT |
| --- | --- |
| Water | 21.60 |
| Triton X-405 (70%) | 2.52 |
| Oleic Acid | 2.11 |
| Pentel 3611 Fluorochemical (25%) | 0.02 |
| Tributoxyethyl Phosphate | 2.11 |
| Tetrasodium EDTA | 0.35 |
| Isopropyl Alcohol | 17.81 |
| Styrene Acrylic Acid Resin Flakes* | 42.95 |
| Concentrated Ammonium Hydroxide | 10.53 |
| | 100.00 | pH = 9.6
Non-volatile = 47%
Non-resin non-volatile = 9.42%
*The resin is 67.5% styrene and 32.5% acrylic acid. The acid number is 180, and the Mn = 3,600 to 4,000 and Mw = 7,000 to 8,000.

When the above formulation was diluted within the range of from 4 to 18% solids, the same produced good gloss and leveling characteristics on the floor and was completely self-strippable.

Alternatively, the above composition was applied to the substrate full strength and diluted on the floor with a wet sponge mop. When applied in this manner, the composition also had excellent gloss and leveling characteristics and was self-stripping.

EXAMPLE XI AND COMPARATIVE EXAMPLES I & II

In order to show the criticality of the acid numbers and molecular weight ranges in the composition of the present invention, the following formulations, which are identical except for the polymer used, were prepared to give a product having a pH = 9.6, a non-volatiles level of 12.0%, and a non-resin non-volatile of 15.74%. Each polymer was formed from varying amounts of MMA (methyl methacrylate), BA (butyl acrylate) and MAA (methacrylic acid).

| COMPONENT | COMPARATIVE EXAMPLE I | COMPARATIVE EXAMPLE II | EXAMPLE XI |
| --- | --- | --- | --- |
| Water | 47.620 | 48.306 | 47.317 |
| Carbitol | 5.000 | 5.000 | 5.000 |
| Ammonium hydroxide | 2.600 | 1.800 | 3.000 |
| FC-420 fluorochemical (1%) | 0.500 | 0.500 | 0.500 |
| Triton X-405 (70%) | 0.823 | 0.823 | 0.823 |
| Polymer A (25.30%) | 40.961 | — | — |
| Polymer B (25.23%) | — | 41.075 | — |
| Polymer C (25.37%) | — | — | 40.864 |
| Tritonloxyethyl phosphate | 0.576 | 0.576 | 0.576 |
| AC-392 polyethylene wax emulsion (25%) | 1.920 | 1.920 | 1.920 |
| | 100.000 | 100.000 | 100.000 |
| Viscosity | 28.5 cps | 7.0 cps | 8.5 cps |

(Polymers A, B, C: See Table I)

TABLE I

| | Composition of Polymer | Acid Number of Polymer | $\overline{Mw}$ | $\overline{Mn}$ |
| --- | --- | --- | --- | --- |
| Polymer A | 50 MMA<br>30 BuA<br>20 MAA | 141 | 98,500 | 21,780 |
| Polymer B | 55 MMA<br>30 BuA<br>15 MAA | 110 | 40,000 | 11,420 |
| Polymer C | 44 MMA<br>30 BuA<br>26 MAA | 183 | 18,400 | 6,140 |

The $\overline{Mn}$ and $\overline{Mw}$ were determined by gel permeation chromatography and the acid numbers were obtained by adjusting the levels of methyl methacrylate and methacrylic acid. In Comparative Example I, the $\overline{Mw}$ is above the range of the present invention although the acid number is within the critical range. Comparative Example II has a molecular weight within the range of the present invention, but the acid number is too low. Example XI is within the scope of the present invention.

The performance of the above products was tested on floors using sponge mops and normal application techniques. The high molecular weight and relatively high acid number of Comparative Example I caused its viscosity to be higher than the viscosity of Comparative Example II and Example XI. The products were allowed to cure under ambient conditions for one week and then the dry films were recoated with the respective products. Comparative Example I became excessively viscous as it dissolved some of the previous film and leveled poorly, exhibiting marks due to the application strokes. In addition, etching occurred where the product was puddled prior to spreading out over the floor. Since this redissolving of the previous coat was so slow, only partial removal occurred, and the final appearance was undesirable as a floor polish. It contained streaks due to the poor leveling, puddle marks due to the etching and uneven gloss.

Although Comparative Example II did not exhibit excessive viscosity when reapplied, it did etch into the dry film where the liquid product was initially puddled. In this case also, the redissolving of the previous coat was too slow and extensive removal occurred only where the puddle was situated. The final appearance was undesirable because of this puddle mark and the uneven gloss. Example XI, on the other hand, was able to rapidly redissolve the previous film wherever the fresh product came into contact with it, and the old coat was completely stripped within a very short period of time. The final film was uniformly glossy and it was not possible to detect where the product had been puddled.

EXAMPLE XII

A floor finish composition having the following formula was prepared:

| COMPONENT | PARTS BY WEIGHT |
|---|---|
| Polymer emulsion at 35% solids* | 29.609 |
| Water | 58.572 |
| Concentrated Ammonium Hydroxide | 3.000 |
| Carbitol | 5.000 |
| 1% solution of Pentel 3611 Fluorochemical | 0.500 |
| Triton X-405 (70%) | 0.823 |
| Tributoxyethyl Phosphate | 0.576 |
| AC-392 Polyethylene Wax Emulsion (25%) | 1.920 |
| | 100.000 | pH = 9.7
Non-volatiles = 12.0%
Non-resin non-volatiles = 15.8%
*Monomer composition of polymer:
    Methyl Methacrylate  46.2%
    Butyl Acytate  30.0%
    Methacrylic Acid  23.8%
Acid Number = 155
  Mn = 13,500
  Mw = 39,400

The composition was self-stripping and performed satisfactorily, however, the gloss and leveling properties were not as good as the lower molecular weight formula (Example II).

EXAMPLE XIII

A floor finish composition having the following composition was prepared:

| COMPONENT | PARTS BY WEIGHT |
|---|---|
| 20% polymer solution* | 50.470 |
| Oleic Acid | 0.360 |
| Perfume | 0.150 |
| Dye (1%) | 0.100 |
| Chelating agent | 0.100 |
| 1% solution of Pentel 3611 Fluorochemical | 0.500 |
| Polypropylene Glycol (Mw =400) | 1.000 |
| Ammonia | 1.733 |
| Water | 43.373 |
| 25% AC-392 Polyethylene Wax Emulsion | 1.440 |
| 27.2% E-43 Polypropylene Emulsion | 0.441 |
| 30% Hydrogen Peroxide | 0.333 |
| | 100.000 | pH = 9.7
Non-volatiles = 12.0%
Non-resin non-volatiles = 19.0%
*The monomer composition of the polymer
was as follows:
    45% α-Methyl-styrene
    30% Ethyl Acrylate
    25% Acrylic Acid
The Mn of the polymer was 3,120, the Mw
was 4,800, and it had an acid number of
155.

This formulation was self-stripping and had good gloss and leveling.

Other modifications may be made in the compositions as will be obvious to those skilled in the art. The invention is not to be limited except as set forth in the following claims.

We claim:

1. In a stable coating composition adapted to simultaneously disperse a previously deposited dried coating composition and replace the dried composition with a fresh coating comprising: 50–96% water, 0–10% plasticizer, 0–5% leveling agent, 0–10% organic solvent, 0–5% surfactant, 0–15% wax, 0–10% film-modifying polymer and 3–18% polymeric coating agent; with the proviso that the total non-volatiles of the composition is in the range of from 4–20% and the combined non-volatiles of the leveling agent, solvent, plasticizer, surfactant, wax and film-modifying polymer are equal to or greater than 9% and less than 200% of the non-volatiles of the polymeric coating agent; the improvement which comprises using as the polymeric coating agent a solution of an alkali-soluble resin having a weight average molecular weight from about 500 to 30,000 and an acid number from about 120 to 550, said resin being an addition resin formed from (a) at least 1 ethylenically unsaturated ligand-free monomer is selected from the group consisting of vinyl toluene, methyl methacrylate, butyl methacrylate, acrylonitrile, vinyl acetate, styrene, α-methyl styrene, butyl acrylate, ethyl acrylate, 2-ethylhexylacrylate and mixtures thereof and (b) at least 1 ethylenically unsaturated monomer having at least 1 carboxyl group is selected from the group consisting of acrylic acid, methacrylic acid, crotonic acid, isocrotonic acid, maleic acid, fumaric acid and itaconic acid, wherein said resins contain from about 40–75% by weight of monomer (a) and from 60–25% by weight monomer (b), wherein the weight ratio of film-modifying polymer to polymeric coating agent is less than 0.57:1, adding aqueous ammonia to said composition in an amount sufficient to provide a pH of no less than 9.0, and said composition being substantially free of complex salts of cross-linking metals.

2. The composition of claim 1 wherein the acid number of the resin is from about 150 to 300.

3. The composition of claim 2 wherein the acid number is from about 150 to 250.

4. The composition of claim 1 wherein the pH is at least 9.5.

5. The composition of claim 1 wherein the molecular weight of the resin is from about 500 to 10,000.

6. The composition of claim 2 wherein the molecular weight of the resin is from about 500 to 10,000.

7. The composition of claim 6 wherein the resin is about 45% α-methyl styrene, about 30% ethyl acrylate and about 25% acrylic acid.

8. The composition of claim 6 wherein the resin is about 68% styrene and about 32% acrylic acid.

9. The composition of claim 6 wherein the resin is a partially esterified styrene-maleic anhydride resin having an acid number of about 200 and a molecular weight of about 1400.

10. In a stable dilutable coating composition adapted to simultaneously disperse a previously deposited dried coating composition and replace the dried composition with a fresh coating comprising: 20–50% water, 0–20% plasticizer, 0–10% wax, 0–20% film-modifying polymer and 18–45% polymeric coating agent; with the proviso that the total non-volatiles of the composition is in the range of from 20–55% by weight and the combined non-volatiles of the leveling agent, solvent, plasticizer, surfactant, wax and film-modifying polymer are equal to or greater than 9% and less than 200% of the non-volatiles of the polymeric coating agent; the improvement which comprises using as said polymeric coating a solution of an alkali-soluble resin having a weight average molecular weight from about 500 to 30,000 and an acid number from about 120 to 550, said resin being an addition resin formed from (a) at least 1 ethylenically unsaturated ligand-free monomer selected from the group consisting of vinyl toluene, methyl methacrylate, butyl methacrylate, acrylonitrile, vinyl acetate, styrene, α-methyl styrene, butyl acrylate, ethyl acrylate, 2-ethylhexylacrylate and mixtures thereof and (b) at least 1 ethylenically unsaturated monomer having at least 1 carboxyl group selected from the group consisting of acrylic acid, methacrylic acid, crotonic acid, isocrotonic acid, maleic acid, fumaric acid and itaconic acid, wherein said resins contain from about 40–75% by weight of monomer (a) and from 60–25% by weight monomer (b), wherein the weight ratio of film-modifying polymer to polymeric coating agent is less than 0.57:1, adding aqueous ammonia to said composition in an amount sufficient to provide a pH of no less than 9.0, and said composition being substantially free of complex salts of cross-linking metals.

11. The composition of claim 10 wherein the pH is at least 9.5.

12. The composition of claim 10 wherein the molecular weight of the resin is from about 500 to 10,000.

13. The composition of claim 1 wherein the combined non-volatiles are equal to or greater than 9% and less than 100%.

14. The composition of claim 10 wherein the combined non-volatiles are equal to or greater than 9% and less than 100%.

15. The composition of claim 10 wherein the acid number is from about 150 to 300.

16. The composition of claim 15 wherein the acid number is from about 150 to 250.

17. The composition of claim 12 wherein the resin is about 45% alphamethyl styrene, about 30% ethyl acrylate, and about 25% acrylic acid.

18. The composition of claim 12 wherein the resin is about 68% styrene and about 32% acrylic acid.

19. The composition of claim 12 wherein the resin is a partially esterified styrene-maleic anhydride resin having an acid number of about 200 and a molecular weight of about 1,400.

20. The composition of claim 15 wherein the molecular weight of the resin is from about 500 to 10,000.

* * * * *